US009549144B2

United States Patent
Thompson

(10) Patent No.: US 9,549,144 B2
(45) Date of Patent: *Jan. 17, 2017

(54) SYSTEMS, METHODS, AND APPARATUS FOR FACILITATING EXPANSION OF MEDIA DEVICE INTERFACE CAPABILITIES

(71) Applicant: ECHOSTAR UK HOLDINGS LIMITED, Keighley, West Yorkshire (GB)

(72) Inventor: Geoffrey Thompson, Keighley (GB)

(73) Assignee: ECHOSTAR UK HOLDINGS LIMITED, Keighley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/049,722

(22) Filed: Feb. 22, 2016

(65) Prior Publication Data

US 2016/0173807 A1 Jun. 16, 2016

Related U.S. Application Data

(63) Continuation of application No. 14/451,894, filed on Aug. 5, 2014, now Pat. No. 9,300,895.

(51) Int. Cl.
*H04N 7/00* (2011.01)
*H04N 11/00* (2006.01)
(Continued)

(52) U.S. Cl.
CPC .......... *H04N 5/44513* (2013.01); *H04N 5/268* (2013.01); *H04N 5/44543* (2013.01);
(Continued)

(58) Field of Classification Search
USPC ....... 348/552, 553, 563, 569, 572, 705, 706, 348/720, 725, 734, 739, 14.02, 14.03, 348/14.05, 14.11; 725/37, 40, 123
See application file for complete search history.

(56) References Cited

U.S. PATENT DOCUMENTS

| | | | |
|---|---|---|---|
| 9,300,895 B2 | 3/2016 | Thompson | |
| 2005/0149767 A1* | 7/2005 | Fei | G06F 1/26 713/300 |
| 2008/0148328 A1* | 6/2008 | Runne | H04N 21/4788 725/109 |
| 2009/0031378 A1* | 1/2009 | Kim | H04N 7/17318 725/109 |
| 2009/0077595 A1* | 3/2009 | Sizelove | G06F 1/1626 725/76 |
| 2011/0090400 A1 | 4/2011 | Huang | |
| 2011/0183656 A1* | 7/2011 | Filipov | H04L 67/04 455/414.3 |
| 2011/0317071 A1 | 12/2011 | McRae | |

(Continued)

FOREIGN PATENT DOCUMENTS

WO 2016/020179 A1 2/2016

OTHER PUBLICATIONS

International Search Report and Written Opinion for PCT/EP2015/066580 mailed Sep. 22, 2015, 10 pages.
(Continued)

*Primary Examiner* — Jefferey Harold
*Assistant Examiner* — Mustafizur Rahman
(74) *Attorney, Agent, or Firm* — Kilpatrick Townsend & Stockton LLP

(57) ABSTRACT

System, methods, apparatus, and computer-readable media to facilitate expansion of media device interface capabilities are provided. A state change with respect to one or more media devices may be detected. The state change may correspond to a second media device being communicatively coupled to, or communicatively decoupled from, a first media device. Consequent to the detecting, a set of interface ports, which are configured to interface with multimedia devices, may be determined. Configuration information may be generated based at least in part on the set of interface ports. The configuration information may be transferred to a sink device to indicate interface options based at least in part on the set of interface ports. Content may be transferred to the sink device based at least in part on audio and/or visual data via at least one interface port of the set of interface ports.

20 Claims, 6 Drawing Sheets

(51) Int. Cl.
*H04N 5/445* (2011.01)
*H04N 5/268* (2006.01)
*H04N 21/422* (2011.01)
*H04N 21/485* (2011.01)
*H04N 21/436* (2011.01)
*H04N 21/4363* (2011.01)
*H04N 21/442* (2011.01)

(52) U.S. Cl.
CPC ... *H04N 5/44582* (2013.01); *H04N 21/42204* (2013.01); *H04N 21/43615* (2013.01); *H04N 21/43632* (2013.01); *H04N 21/43635* (2013.01); *H04N 21/44227* (2013.01); *H04N 21/485* (2013.01)

(56) References Cited

U.S. PATENT DOCUMENTS

| | | | |
|---|---|---|---|
| 2012/0106932 A1* | 5/2012 | Grevers, Jr. | H04N 21/472 386/292 |
| 2012/0192229 A1* | 7/2012 | Hunter | H04N 5/45 725/38 |
| 2013/0283025 A1 | 10/2013 | Madonna et al. | |

OTHER PUBLICATIONS

U.S. Appl. No. 14/451,894, filed Aug. 5, 2014, Notice of Allowance mailed Nov. 20, 2015, 38 pages.

\* cited by examiner

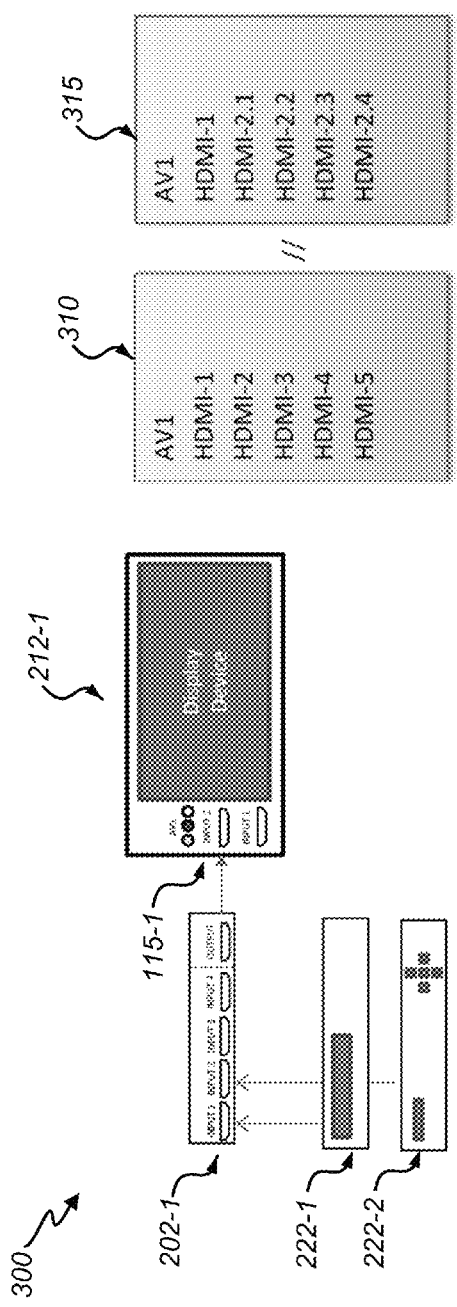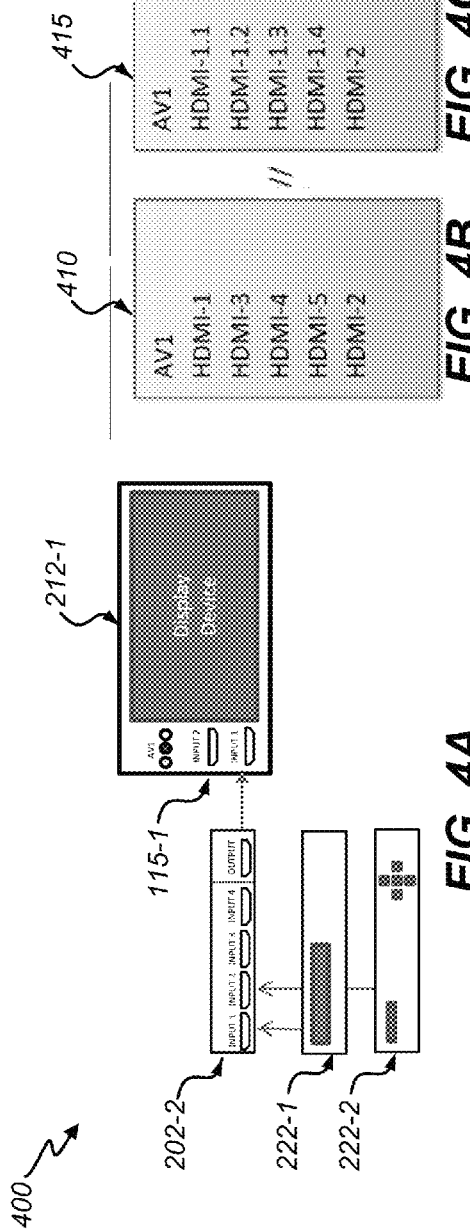

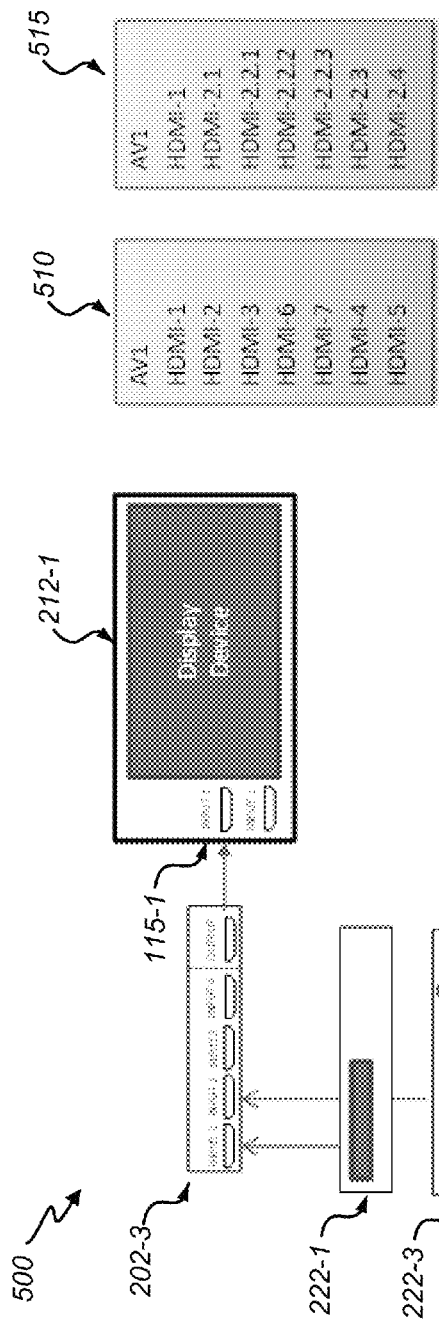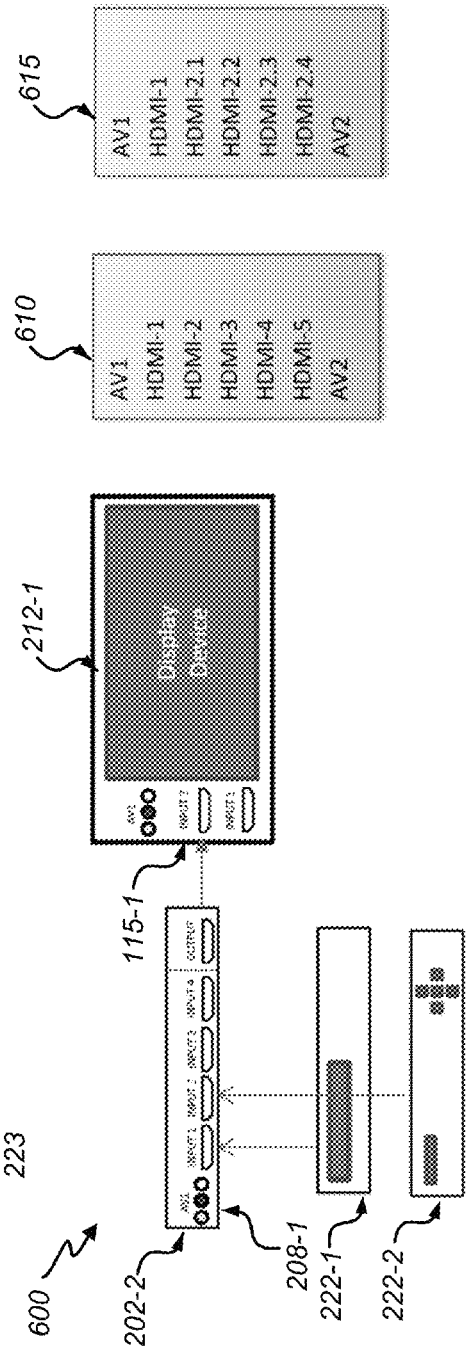

SYSTEMS, METHODS, AND APPARATUS FOR FACILITATING EXPANSION OF MEDIA DEVICE INTERFACE CAPABILITIES

CROSS-REFERENCE TO RELATED APPLICATIONS

This application is a continuation of U.S. application Ser. No. 14/451,894, filed Aug. 5, 2014, the disclosure of which is incorporated by reference herein in its entirety.

BACKGROUND

The present disclosure relates in general to high-definition multimedia interfaces, and, more specifically, but not by way of limitation, to systems, methods, and apparatus for facilitating expansion of media device interface capabilities.

HDMI® (High-Definition Multimedia Interface) (hereinafter "HDMI") is an industry standard for connecting digital audiovisual devices with a compact cable to enable transfer of audiovisual data. Multiple versions of HDMI have been developed as bandwidth and/or other capabilities of audiovisual data transfer increase, with recent releases including HDMI versions 1.4 and 2.0. As capabilities and features of multimedia devices continue to increase, content viewers have come to expect that their television receivers offer a number of robust and useful features. Companies are expected to compete to provide better capabilities and features. There is a need for solutions to address problems related to systems with overly limited HDMI capabilities.

BRIEF SUMMARY

Certain embodiments of the present disclosure relate in general to high-definition multimedia interfaces, and, more specifically, but not by way of limitation, to systems, methods, and apparatus for facilitating expansion of media device interface capabilities.

In one aspect, a system to facilitate expansion of media device interface capabilities is provided. The system may include any one or combination of the following. A first media device may be configured to be communicatively couplable to a second media device. The first media device may be configured to perform any one or combination of the following. A first set of one or more interface ports that are configured to interface with one or more multimedia devices may be recognized. The second media device may be recognized when the second media device is communicatively coupled to the first media device. A second set of one or more interface ports provided by the second media device may be determined. A third set of interface ports may be determined based at least in part on the first set and the second set. Configuration information may be generated based at least in part on the third set of interface ports. The configuration information may be provided to a display to facilitate indication of interface options based at least in part on the third set of interface ports. Content may be provided to the display based at least in part on audio and/or visual data via at least one interface port of the second set of one or more interface ports provided by the second media device.

In another aspect, a method to facilitate expansion of media device interface capabilities is provided. The method may include any one or combination of the following, which may be performed by a first media device. A first set of one or more interface ports that are configured to interface with one or more multimedia devices may be recognized. The second media device may be recognized when the second media device is communicatively coupled to the first media device. A second set of one or more interface ports provided by the second media device may be determined. A third set of interface ports may be determined based at least in part on the first set and the second set. Configuration information may be generated based at least in part on the third set of interface ports. The configuration information may be provided to a display to facilitate indication of interface options based at least in part on the third set of interface ports. Content may be provided to the display based at least in part on audio and/or visual data via at least one interface port of the second set of one or more interface ports provided by the second media device.

In yet another aspect, one or more non-transitory, machine-readable media having machine-readable instructions thereon are provided. The instructions, when executed by one or more processing devices, may facilitate expansion of media device interface capabilities, causing the one or more processing devices to perform any one or combination of the following. A first set of one or more interface ports that are configured to interface with one or more multimedia devices may be recognized. The second media device may be recognized when the second media device is communicatively coupled to the one or more processing devices. A second set of one or more interface ports provided by the second media device may be determined. A third set of interface ports may be determined based at least in part on the first set and the second set. Configuration information may be generated based at least in part on the third set of interface ports. Provision of the configuration information to a display may be caused, to facilitate indication of interface options based at least in part on the third set of interface ports. Provision of content to the display may be caused, based at least in part on audio and/or visual data via at least one interface port of the second set of one or more interface ports provided by the second media device.

In various embodiments, the second media device may comprise one or more of a television, a television receiver, a set-top box, and/or a media player. In various embodiments, the second media device may include a media switch with a set of one or more output ports, a set of two or more input ports that are configured to interface with one or more additional multimedia devices, the set of two or more input ports corresponding at least in part to the set of one or more interface ports. In various embodiments, the second media device may comprise one or more of a television receiver, a set-top box, and/or a media player with a set of one or more output ports, a set of two or more input ports that are configured to interface with one or more additional multimedia devices, the set of two or more input ports corresponding at least in part to the set of one or more interface ports.

In various embodiments, determining the second set of one or more interface ports provided by the second media device may include processing a first indication from the second media device that indicates information about one or more capabilities of the second media device. In various embodiments, the information about one or more capabilities of the second media device may include information about a number of ports and one or more port type.

In various embodiments, the indication of interface options based at least in part on the third set of interface ports may indicate one or more port types. In various embodiments, determining the second set of one or more interface ports provided by the second media device may include processing a second indication from the second media device that indicates an address associated with the second media device Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

FIGS. 3A, 3B, and 3C show a system, in accordance with certain embodiments of the present disclosure.

FIGS. 4A, 4B, and 4C show a system, in accordance with certain embodiments of the present disclosure.

FIG. 5 shows an example system with cascaded switches, in accordance with certain embodiments of the present disclosure.

FIG. 6 shows an example system, in accordance with certain embodiments of the present disclosure.

DETAILED DESCRIPTION

Figure 1:
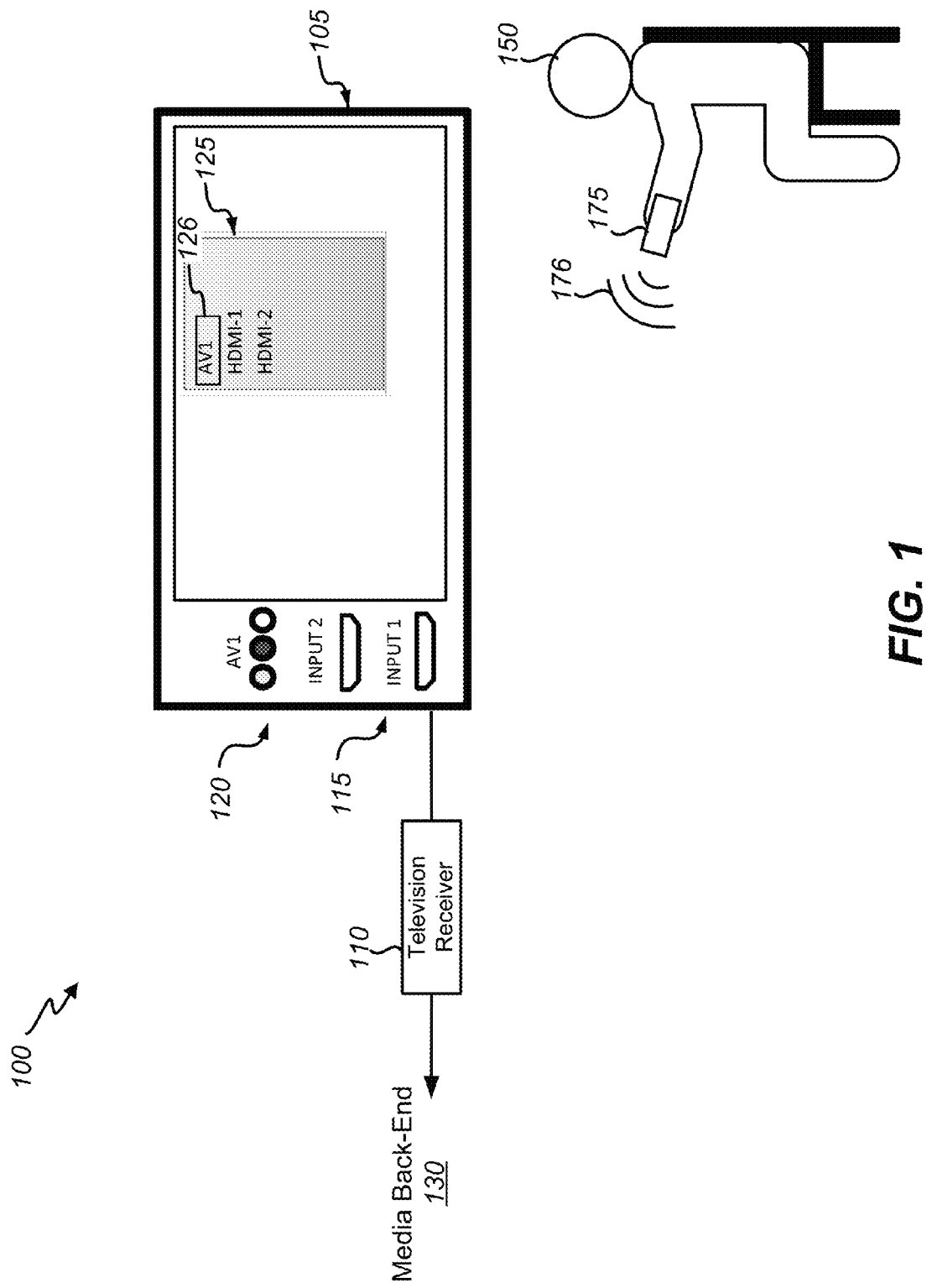
FIG. 1 shows a typical setup of a display device, such as a television, within which context certain embodiments of the present disclosure may be applied.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Certain embodiments of the present disclosure relate in general to high-definition multimedia interfaces, and, more specifically, but not by way of limitation, to systems, methods, and apparatus for facilitating a virtual port expander. In certain embodiments, the virtual port expander may apply to HDMI ports. As noted above, HDMI is an industry standard for connecting digital audiovisual devices with a compact cable to enable transfer of audiovisual data. Multiple versions of HDMI have been developed as bandwidth and/or other capabilities of audiovisual data transfer increase, with recent releases including HDMI versions 1.4 and 2.0.

With respect to certain media devices, such as television receivers, two situations may commonly occur which create limitations for the installation. Firstly a display or set-top box (STB) may be shipped with only a single HDMI input port to allow external devices to be plugged into the display or STB. Secondly with the arrival of 4K resolution and ultra-high definition television (UHDTV) devices which require an HDMI 2.0 input, a display or STB may start out with only one HDMI 2.0 port, with others being HDMI 1.4. Certain embodiments of the present disclosure may provide solutions that provide better HDMI port capabilities, flexibility, and features. Certain embodiments may provide HDMI 2.0 based switches such that it is possible to upgrade displays which have multiple HDMI inputs but only one capable of HDMI 2.0.

Certain embodiments according to the present disclosure may provide for a virtual port expander. A virtual port expander may add more HDMI ports to a system, obviating a need for manual switching, and a separate controller. In some embodiments, a display device (e.g., a television receiver or monitor) may be configured to provide a virtual port expander. With some embodiments, an external television receiver or STB may be configured with a virtual port expander, which could be implemented with an external unit to the display.

Certain embodiments may include a port expander/switch that has been enabled with virtual port features and an STB, TV, or other media device also enabled with virtual port features. Certain embodiments of a display device or television receiver may be configured to recognize one or more external devices using signaling. The display device or television receiver may query the number of additional ports that have been added via the external device and then include these in the user interface/input source options. For example, a television originally manufactured with HDMI ports 1 to 4 could be expanded by adding a 2-port switch to port 4, so that the television would then cycle through HDMI ports 1 to 5. When selecting ports 4 or 5, a controller would then need to switch to its fourth input and signal the external device to switch to either its port 1 or port 2. Certain embodiments could be driven towards a standard to allow televisions and/or television receivers to work easily with third-party devices.

Currently, there exist mechanisms within HDMI using, for instance, the CEC command line to allow devices to automatically switch and connect themselves to the TV when they are powered on. However, there are flaws with this protocol, so often it is disabled and its features ignored. For instance, turning off a DVD player connected to a TV with CEC enabled will often also cause the TV to turn off. Or, turning on the TV, may cause a connected device to turn on when it is not required to do so. Often, this means that the protocol is disabled and its features are ignored.

What is needed is an improved implementation using a new set of commands within the protocol. Typically, with a television display, a user is accustomed to pressing a "Source" or "Input" button which cycles around connected devices. Certain embodiments allow for the creation of virtual inputs on a display device. In accordance with certain embodiments, when a switch device is connected to a media device (e.g., a television, a display device, STB, etc.), the additional ports are reflected at the sink device and added to its list as additional inputs. In this way, it becomes possible for a user to simply switch between devices by switching among a series of inputs as if the display device had been equipped with more ports from the outset.

With the protocol of certain embodiments, cascading of devices may be facilitated. For example, adding a STB with two ports to a TV, might add the additional ports to the TV list. Control of the system from the TV may thereby be simplified.

Various embodiments will now be discussed in greater detail with reference to the accompanying figures, beginning with FIG. 1.

FIG. 1 shows a typical setup 100 of a display device 105, such as a television. In some cases, a television receiver 110, which may be a set-top box (STB), may be communicatively coupled to the display device 105. The television receiver 110 could be communicatively coupled to a media service back-end 130, which may correspond to certain upstream elements of a media content distribution system (e.g., a satellite television distribution system, a cable television distribution system, an IPTV (Internet Protocol Television) content distribution system, and/or any other type of media or content distribution system).

The display device 105 can be controlled by a user 150 using control buttons (not shown) on the display device 105 and/or the user 150 using a user input device 175 that can send wireless signals 176 to communicate with the television receiver 110 and/or display device 105. The display device 105 includes two input ports 115 (which could be HDMI inputs ports) and an analog AV port 120.

An AV source command of a display controller for the display device 105 may be provided. This could be selectable by way of user-selectable options (e.g., selection option 126) on the display device 105, via the remote control device 175. After selecting the AV source command, the user 150 typically will be presented in some fashion with a choice of possible sources 125. This may be a list of available devices, or it may sequentially cycle around available inputs. In the case depicted, two standard HDMI ports 115 plus an analog port 120 are available. In some cases, only ports with active HDMI sources may be displayed. This may be a feature of the particular implementation. The user 150 can then select 126 a particular input using buttons on either the display device 105 or the remote control device 175.

Figure 2:
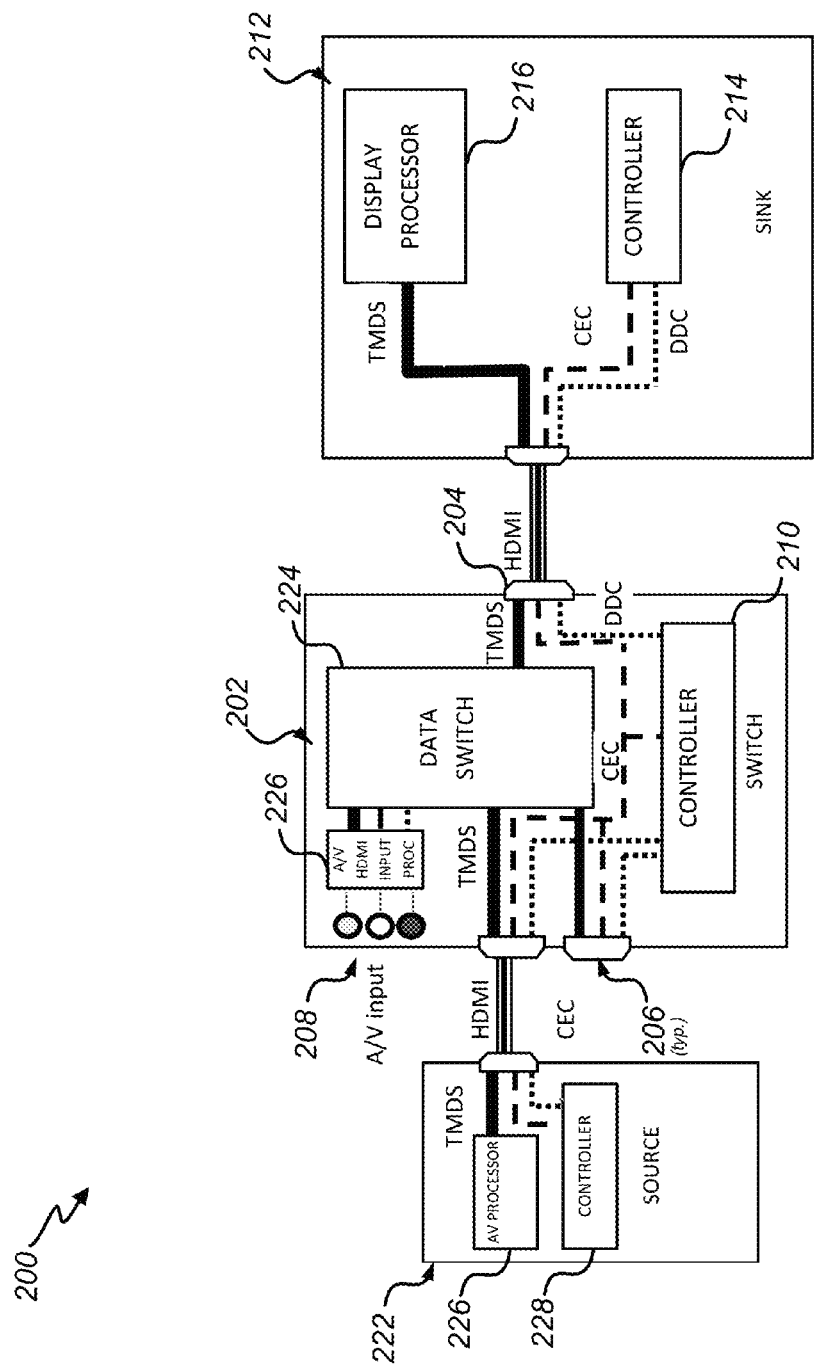
FIG. 2 shows a diagram of a system, in accordance with certain embodiments of the present disclosure.

FIG. 2 shows a diagram of a virtual port system 200, in accordance with certain embodiments of the present disclosure. The system 200 may include a switch device 202. The switch device 202 may be a virtual port enabled switch device 202 in certain embodiments. The switch device 202 may be implemented in various embodiments with any suitable device(s) and data connection(s). In various embodiments, the switch device 202 may be separate or may be integrated in a STB or external television receiver device.

The switch device 202 may include one or more HDMI output ports 204 and two or more HDMI input ports 206. Though other embodiments are possible, the non-limiting example depicts one output port 204 and two input ports 206. The switch device 202 may have routing capability under control of a controller 210. In some embodiments, the controller 210 may be configured to direct content encoded in the TMDS data format from one or more of the input ports 206 to the output port 204.

The switch device 202 may include one or more data switches 224. The one or more data switches 224 may be communicatively coupled between the input ports 206 and output ports 204 and configured to allow for data switching under control of the controller 210. The switch device 202 may also have additional analog input ports 208, e.g., SCART, CVBS, YPrPb, etc, for analog input with the switch device 202. The switch device 202 may be configured to convert those to digital format using an AV input processor 226, which may include one or more analog-to-digital converters and may be configured to digitize and convert analog input to HDMI format. In this case, the switch device 202 may also signal to a sink device 212 that the switch device 202 supports those additional input types.

The switch device 202 may be couplable to one or more sink devices 212 and to one or more source devices 222. The non-limiting example depicts one sink device 212 and one source device 222. The sink device 212 may include any one or combination of a television, a display device, television receiver, STB, and/or other media device in various embodiments. In some embodiments, the sink device 212 may include the switch device 202. Reference to such devices as sinks and/or source may not be necessarily limiting, as at times and in certain respects and embodiments one or more of the sink devices 212 may function as source(s) and/or one or more of the source devices 222 may function as sink(s). The source device 222 may include an audiovisual processor 226 and a controller 228.

A sink controller 214 of the sink device 212 may store information about the number of ports the switch device 202 supports and which ports 204, 206 are currently active. When connected into a system 200, the Switch device 202 may notify connected sink devices 212 as to what capabilities are supported and so that one or more of the connected sink devices 212 can create a map of the system. By way of example, the Switch device 202 may transmit a <Send Switch Capability> message so that any connected sink devices 212 may be notified. Such information may be communicated when the Switch device 202 is first connected and/or at any other suitable time, such as when the system state changes, such as when a source device 222 is added or removed.

The sink controller 214 may add the appropriate number of new source devices 222 to the available number of source devices 222. Information pertaining to the source devices 222 may be presentable with the sink device 212 via a display list (e.g., an on-screen menu, pop-up, etc.). In the case that a source device 222 also includes one or more HDMI inputs (not shown), the same or similar protocol may be used to inform the sink device 212 about the additional HDMI inputs added to the system 200.

Sink device 212 may include a display processor 216 which receives and processes the audiovisual data delivered by TMDS. The sink controller 214 may be responsible for communicating with source devices 222 (and other sink device(s), if applicable) in the system 200 by way of the switch device 202. When a switch device 202 is added to the system 200, the switch device 202 may be responsible to transmit a <Send Switch Capability> message. The switch device 202 may transmit such information at any suitable time, e.g., when the system state changes, such as when a source device 222 is added or removed.

The sink controller 214 of the sink device 212 may include a Consumer Electronics Control (CEC) controller and/or a Display Data Channel (DDC) controller to send and receive commands to connected devices. Accordingly, the sink controller 214 may manage via signals based on CEC and/or DDC signaling. As depicted, the switch controller 210 may be configured to facilitate communication between the source device 222 and the sink device 212 based on CEC and/or DDC protocols.

The sink controller 214 may maintain a default list of inputs permanently embedded in the sink device 212. When an additional switch device 202 is added, the sink controller 214 may be responsible for extending the list based on the additional ports. In some embodiments, the switch device 202 may be configured to prompt the extension of the list of ports to reflect the n−1 ports added to the system 200.

In certain embodiments, a user may be able to rename the device inputs. For example, the user may rename the device inputs via the display device 212. The user may directly select his devices using the source input button or any suitable mechanism in place on the display device 212.

In some cases, when cycling around the list of available ports, the display device 212 may only present those which have a currently connected and active device. In some cases, the display device 212 may show connected but inactive devices. Since part of the CEC protocol provides the physical and logical addressing for devices connected via HDMI, this information can be used to filter the list of presented devices. The sink device 212 may still be able to show a list in the format consistent with the sink device 212.

Certain embodiments may accommodate the use of a standard switch device being connected. As individual devices are connected to the switch, the sink device 212 may learn from the physical address tables how many ports are currently connected. For example, if a switch is connected with one source on port 3, the sink device 212 may identify that a switch with minimum of three ports has been connected. The sink device 212 can choose to add either all three ports or just the active port. The sink controller 214 may retain information about the switch in the system 200 with at least three HDMI input ports. So long as the switch remains connected, the sink controller 214 may present an additional two HDMI inputs (n−1). Accordingly, certain embodiments of virtual HDMI provide for a learning mode.

When a switch device 202 is connected, it may signal to the sink device 212 (e.g., the display) the number of ports that it is providing. There are several mechanisms that can be used to provide the signaling and control. CEC protocol, which provides two-way communication, may be used in order for the sink device to determine what sources and switches are connected.

FIGS. 3A, 3B, and 3C show a virtual port system 300, in accordance with certain embodiments of the present disclosure. FIGS. 4A, 4B, and 4C show a virtual port system 400, in accordance with certain embodiments of the present disclosure. Incorporating a virtual port capable switch 202 into the systems 300, 400 provides an additional number of ports. The useful number of ports added may be one less than the number of input ports on the switch 202. The non-limiting examples show adding a 4-port input switch 202, which provides a total of three additional ports.

There are several ways in which new numbering schemes can be arranged. The systems 300, 400 show examples of what may happen when a switch 202 is added to one of the input ports 115. FIG. 3B shows a simple numbering scheme 310 which follows the original TV numbering scheme. However, when the switch 202 is added to port 1 of the display device 212, there is a potential dilemma as to how to number the inputs and how to order them, if the existing port numbers are left assigned (410) as in FIG. 3B. FIG. 3C and FIG. 4C show alternative schemes 315, 415 which may be easier to understand by providing an indication of where a device may be plugged in. The schemes 315, 415 may be based on a combination of original port combined with port switch number. There may be similar related schemes which would also work well.

FIG. 5 shows an example system 500 with cascaded switches, in accordance with certain embodiments of the present disclosure. Source device 222-3 may be a switch in some embodiments and may provide additional inputs 223. The additional inputs 223 may, accordingly, be reflected with the schemes 510 and/or 515.

FIG. 6 shows a further example system 600, in accordance with certain embodiments of the present disclosure. In system 600, the switch 202 may include an analog AV input port 208-1 from which signals can be captured and converted to HDMI signals. The additional inputs 223 may, accordingly, be reflected with the schemes 610 and/or 615.

Figure 7:
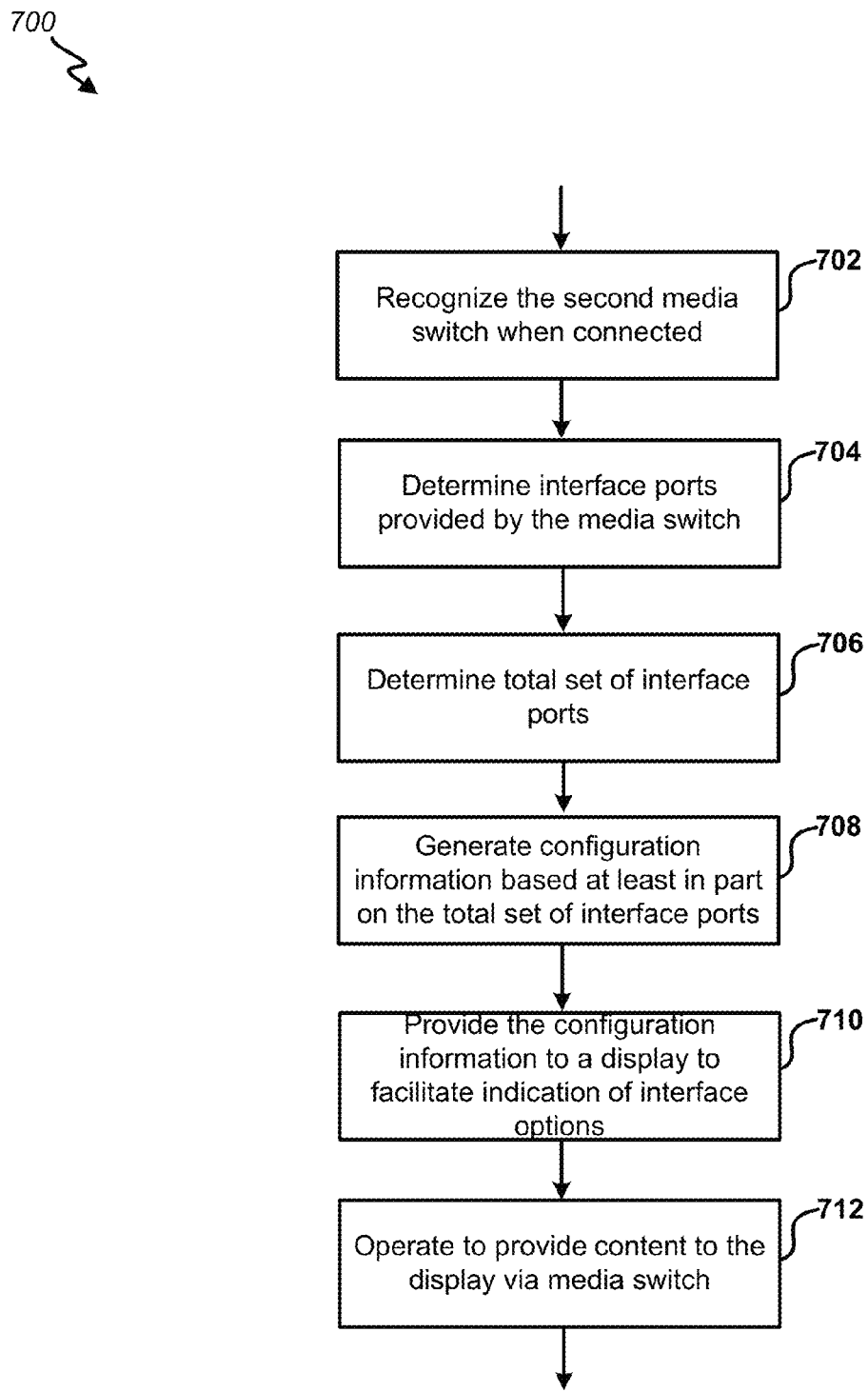
FIG. 7 illustrates an example method, in accordance with certain embodiments of the present disclosure.

Referring now to FIG. 7, an example method 700 for facilitating expansion of media device interface capabilities, in accordance with certain embodiments of the present disclosure. Teachings of the present disclosure may be implemented in a variety of configurations that may correspond to the configurations disclosed herein. As such, certain aspects of the methods disclosed herein may be omitted, and the order of the steps may be shuffled in any suitable manner and may depend on the implementation chosen. Moreover, while the aspects of the methods disclosed herein, may be separated for the sake of description, it should be understood that certain steps may be performed simultaneously or substantially simultaneously.

As indicated by block 702, in some embodiments, a sink device 212 may recognize a switch device 202 that is communicatively coupled to the sink device 212. As indicated by block 704, a set of one or more interface ports provided by the switch device 202 may be determined. As indicated by block 706, a total set of interface ports may be determine based at least in part on the set of ports native to the sink device 212 and the set of one or more interface ports provided by the switch device 202. As indicated by block 708, configuration information may be generated based at least in part on the set of one or more interface ports provided by the switch device 202.

As indicated by block 710, the configuration information may be provided to facilitate display of the interface options. As indicated by block 712, the sink device 212 may operate to provide content for display based at least in part on audio and/or visual data via at least one interface port of the second set of one or more interface ports provided by the switch device 202.

With certain embodiments, several new commands may be created that could, for example, be used with method 700. The system may generate a set of commands in the same and/or similar form as other CEC commands. In some embodiments, the set of commands may use message codes which are currently unallocated or unused. Table 1 below shows the indicative format of an example set of commands making use of currently undefined message codes. Table 2 shows corresponding new operand descriptions which are also required.

TABLE 1

Message Descriptions

| Opcode | Value | Description | Parameters | Parameter Description | Response | Directly Addressed | Broadcast |
|---|---|---|---|---|---|---|---|
| <Send Switch Capability> | 0xB1 | Sent from switch device when a new connection is made or switch is powered up. | [Physical Address] [QTY HDMI Ports] [QTY AV Ports] | Information on number of ports added to system Number of HDMI ports + number of additional A/V ports | | | • |
| <Query Switch> | 0xB2 | Sent from display to re-determine switch configuration | [Physical Address] | | <Send Switch> | • | |
| <Send Switch> | 0xB3 | Provides info on switch configuration | [Physical Address] [QTY HDMI Ports] [QTY AV Ports] | | | • | |
| <Query Switch A/V> | 0xB4 | Requests info on any additional port types supported by a switch | [Physical Address] [AV Port] | Number of A/V port to query | <Send Switch A/V> | • | |
| <Send Switch A/V> | 0xB5 | Provides a descriptive name for any additional inputs | [OSD Name] | Text string describing A/V input port | | • | |

TABLE 2

Operand Descriptions

| Name | Range Description | Length | Purpose |
|---|---|---|---|
| [QTY HDMI Ports] | 0 < N < 255 | 1 Byte | Specifies number of HDMI ports |
| [QTY AV Ports] | 0 < N < 255 | 1 Byte | Specifies number of AV ports |
| [AV Port] | 1 < N < 255 | 1 Byte | Number of AV port to query |

The exact messaging and final operand codes may be varied depending upon the standardization procedure. It may also be possible to create this using reserved vendor ID commands.

A first command may allow an HDMI switch to signal how many HDMI input ports it supports, plus how many alternate A/V inputs it supports such as composite, RGB, YPrPb, etc. The command may have a format similar to <Send Switch Capability>. Along with the physical address of the device, this can be used to build the menu in the display device. This message will be broadcast by the switch whenever it is first connected or powered up in a new system. In case the media device includes inbuilt functionality such as a STB with input port switches, the inbuilt function will be reported by this command as an additional input port.

There may be circumstances when the display itself is missing information on the switch capability. In this case the display device may send a message similar to the <Query Switch>, this will case the switch to resend its information using the <Send Switch> message. This message contains the same information as the <Send Switch capability> so may possibly be combined.

In case there are alternate A/V inputs supported, it could be advantageous to discover what type of input each of these is. To that end, a set of one or more messages may be generated. The display device may send a <Query Switch A/V> command which may allow the HDMI switch to respond with a <Send Switch A/V> message containing a text description for the type of input, which can then be used to display on the controlling device.

The results of the <Send Switch Capability> message may be used by the sink device to add an additional n−1 HDMI inputs to the list of available devices displayed by the sink device. In addition, it may also add the additional A/V inputs and display their type by using the <Query Switch A/V> command. The HDMI switch device may determine what the physical address will be for each of its input ports. The HDMI switch device may allocate a physical address for any A/V input ports. The address for the A/V inputs may be allocated in sequence after the HDMI input ports. Addresses may be allocated starting at address 1. So, if there are 4 HDMI inputs, then the analog A/V inputs will start at address 5.

When the user then selects an input via the on screen menus, if it is delivered by the HDMI switch, the sink may the send a <Set Stream Path> message to correctly route the signal. This may happen even though there may be no device connected, or the device may be inactive. The user may then turn on the target device manually. If one of analog A/V inputs is selected from the sink device, then the HDMI switch may convert the input to HDMI format and route it to the sink device.

Figure 8:
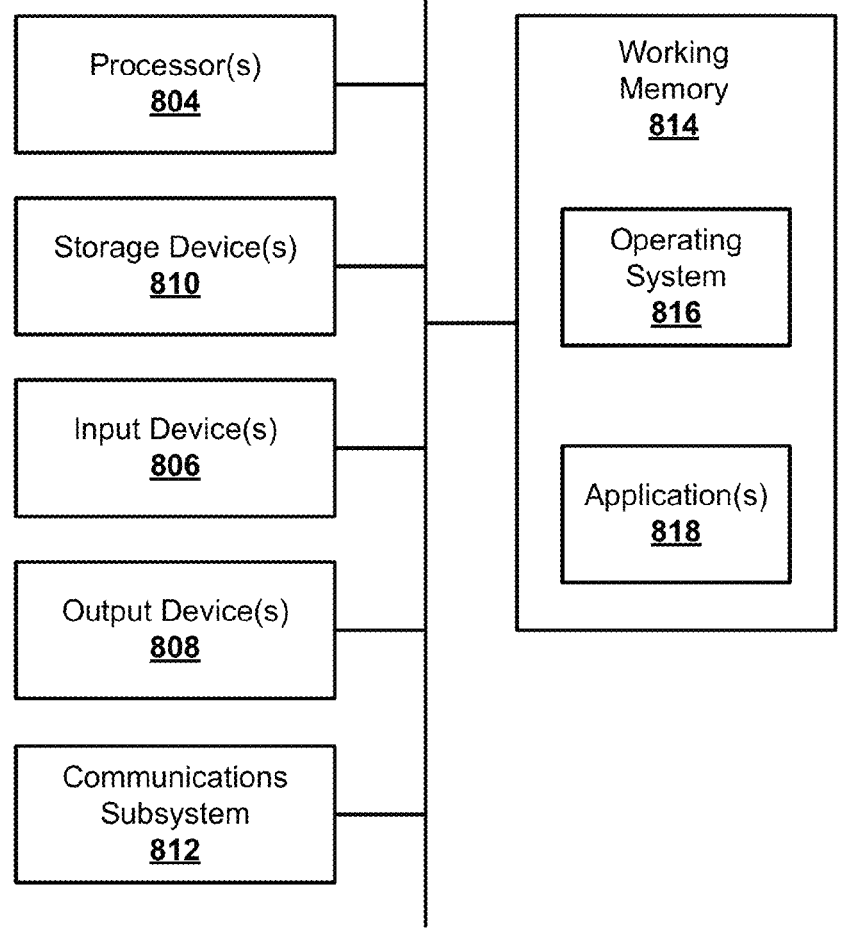
FIG. 8 illustrates a computer system, in accordance with certain embodiments of the present disclosure.

A computer system as illustrated in FIG. 8 may be incorporated as part of the previously described computerized devices. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system to facilitate expansion of media device interface capabilities, the system comprising:
    a first media device configured to be communicatively couplable to a plurality of media devices, the first media device further configured to:
        detect a state change with respect to one or more media devices of the plurality of media devices, wherein the state change corresponds to a second media device of the plurality of media devices being communicatively coupled to, or communicatively decoupled from, the first media device;
        consequent to the detecting the state change, determine a set of one or more interface ports that are configured to interface with one or more multimedia devices;
        generate configuration information based at least in part on the set of one or more interface ports;
        transfer the configuration information to a sink device to indicate interface options based at least in part on the set of one or more interface ports; and
        operate to transfer content to the sink device based at least in part on audio and/or visual data via at least one interface port of the set of one or more interface ports.

2. The system to facilitate expansion of media device interface capabilities of claim 1, wherein the state change corresponds to the second media device of the plurality of media devices being communicatively coupled to the first media device, and the first media device is further configured to:
    while the second media device of the plurality of media devices is communicatively coupled to the first media device, detect a second state change that corresponds to a third media device of the plurality of media devices being communicatively coupled to, or communicatively decoupled from, the first media device, and determine a second set of one or more interface ports consequent to the detecting;
    generate second configuration information based at least in part on the second set of one or more interface ports;
    transfer the second configuration information to the sink device to indicate interface options based at least in part on the second set of one or more interface ports; and
    operate to transfer additional content to the sink device based at least in part on additional audio and/or visual data via at least one interface port of the second set of one or more interface ports.

3. The system to facilitate expansion of media device interface capabilities of claim 1, wherein the second media device comprises one or more of a television, a television receiver, a set-top box, and/or a media player.

4. The system to facilitate expansion of media device interface capabilities of claim 1, further comprising:

the second media device, wherein the second media device comprises a media switch with:
a set of one or more output ports; and
a set of two or more input ports that are configured to interface with one or more additional multimedia devices, the set of two or more input ports corresponding at least in part to the set of one or more interface ports.

5. The system to facilitate expansion of media device interface capabilities of claim 1, further comprising:
the second media device, wherein the second media device comprises one or more of a television receiver, a set-top box, and/or a media player with:
a set of one or more output ports; and
a set of one or more input ports that are configured to interface with one or more additional multimedia devices, the set of one or more input ports corresponding at least in part to the set of one or more interface ports.

6. The system to facilitate expansion of media device interface capabilities of claim 1, wherein the determining the set of one or more interface ports comprises determining one or more interface ports provided by the second media device based at least in part on processing a first indication from the second media device that indicates information about one or more capabilities of the second media device.

7. The system to facilitate expansion of media device interface capabilities of claim 6, wherein the information about one or more capabilities of the second media device comprises information about a number of ports and one or more port types.

8. The system to facilitate expansion of media device interface capabilities of claim 1, wherein the configuration information indicates one or more port types.

9. The system to facilitate expansion of media device interface capabilities of claim 1, wherein the determining the set of one or more interface ports comprising determining one or more interface ports provided by the second media device based at least in part on processing a second indication from the second media device that indicates an address associated with the second media device.

10. The system to facilitate expansion of media device interface capabilities of claim 1, wherein the sink device comprises one or more of a television, a television receiver, a set-top box, and/or a display device.

11. A method to facilitate expansion of media device interface capabilities, the method comprising:
detecting with a first media device a state change with respect to one or more media devices of a plurality of media devices, wherein the state change corresponds to a second media device of the plurality of media devices being communicatively coupled to, or communicatively decoupled from, the first media device;
consequent to the detecting the state change, determining with the first media device a set of one or more interface ports that are configured to interface with one or more multimedia devices;
generating with the first media device configuration information based at least in part on the set of one or more interface ports;
transferring with the first media device the configuration information to a sink device to indicate interface options based at least in part on the set of one or more interface ports; and
operating with the first media device to transfer content to the sink device based at least in part on audio and/or visual data via at least one interface port of the set of one or more interface ports.

12. The method to facilitate expansion of media device interface capabilities of claim 11, wherein the state change corresponds to the second media device of the plurality of media devices being communicatively coupled to the first media device, and the method further comprises:
while the second media device of the plurality of media devices is communicatively coupled to the first media device, detecting with the first media device a second state change that corresponds to a third media device of the plurality of media devices being communicatively coupled to, or communicatively decoupled from, the first media device, and determine a second set of one or more interface ports consequent to the detecting;
generating with the first media device second configuration information based at least in part on the second set of one or more interface ports;
transfer with the first media device the second configuration information to the sink device to indicate interface options based at least in part on the second set of one or more interface ports; and
operate to transfer additional content with the first media device to the sink device based at least in part on additional audio and/or visual data via at least one interface port of the second set of one or more interface ports.

13. The method to facilitate expansion of media device interface capabilities of claim 11, wherein the second media device comprises one or more of a television, a television receiver, a set-top box, and/or a media player.

14. The method to facilitate expansion of media device interface capabilities of claim 11, wherein the determining the set of one or more interface ports comprises determining one or more interface ports provided by the second media device based at least in part on processing a first indication from the second media device that indicates information about one or more capabilities of the second media device.

15. The method to facilitate expansion of media device interface capabilities of claim 14, wherein the information about one or more capabilities of the second media device comprises information about a number of ports and one or more port types.

16. The method to facilitate expansion of media device interface capabilities of claim 11, wherein the configuration information indicates one or more port types.

17. The method to facilitate expansion of media device interface capabilities of claim 11, wherein the determining the set of one or more interface ports comprising determining one or more interface ports provided by the second media device based at least in part on processing a second indication from the second media device that indicates an address associated with the second media device.

18. The method to facilitate expansion of media device interface capabilities of claim 11, wherein the sink device comprises one or more of a television, a television receiver, a set-top box, and/or a display device.

19. One or more non-transitory, machine-readable media having machine-readable instructions thereon which, when executed by one or more processing devices, facilitate expansion of media device interface capabilities, causing the one or more processing devices to:
detect a state change with respect to one or more media devices of the plurality of media devices, wherein the state change corresponds to a second media device of the plurality of media devices being communicatively coupled to, or communicatively decoupled from, a first media device;

consequent to the detecting the state change, determine a set of one or more interface ports that are configured to interface with one or more multimedia devices;

generate configuration information based at least in part on the set of one or more interface ports;

transfer the configuration information to a sink device to indicate interface options based at least in part on the set of one or more interface ports; and operate to transfer content to the sink device based at least in part on audio and/or visual data via at least one interface port of the set of one or more interface ports.

20. The one or more non-transitory, machine-readable media of claim 19, wherein the instructions further cause the one or more processing devices to:

while the second media device of the plurality of media devices is communicatively coupled to the first media device, detect a second state change that corresponds to a third media device of the plurality of media devices being communicatively coupled to, or communicatively decoupled from, the first media device, and determine a second set of one or more interface ports consequent to the detecting;

generate second configuration information based at least in part on the second set of one or more interface ports;

transfer the second configuration information to the sink device to indicate interface options based at least in part on the second set of one or more interface ports; and operate to transfer additional content to the sink device based at least in part on additional audio and/or visual data via at least one interface port of the second set of one or more interface ports.

\* \* \* \* \*